Patented May 6, 1924.

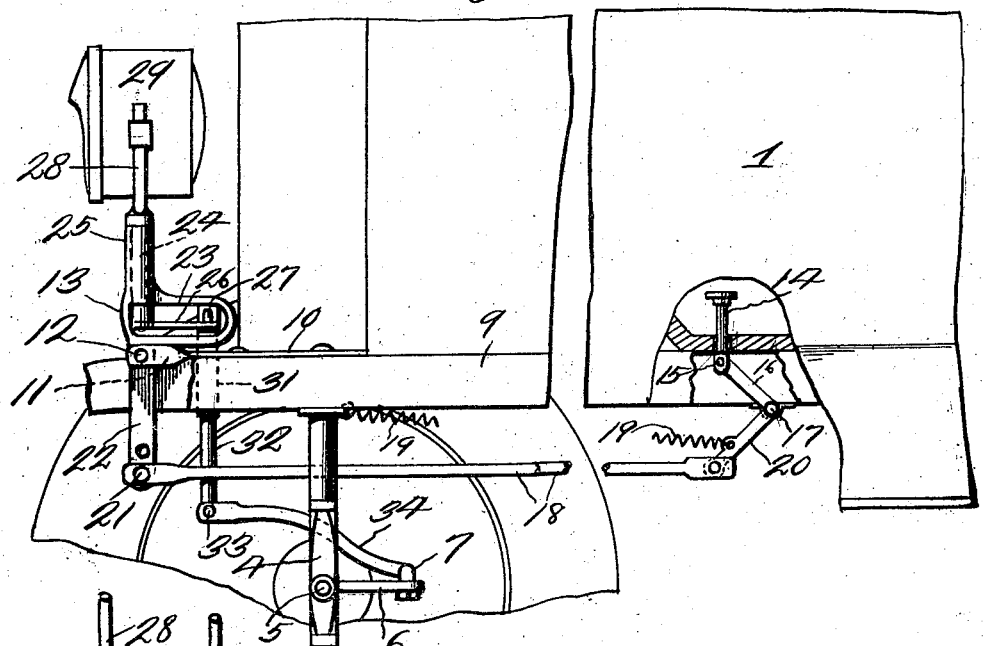
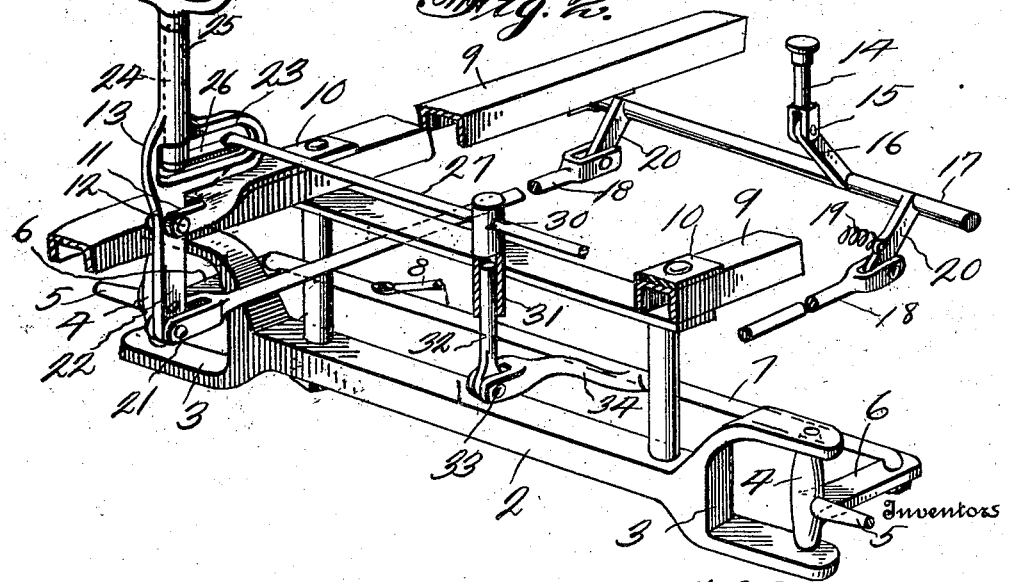

1,493,129

UNITED STATES PATENT OFFICE.

NIELS C. SORENSEN AND JOHN A. SPRINGET, OF KANKAKEE, ILLINOIS.

DIRIGIBLE HEADLIGHT.

Application filed May 4, 1923. Serial No. 636,593.

*To all whom it may concern:*

Be it known that we, NIELS C. SORENSEN and JOHN A. SPRINGET, citizens of the United States, residing at Kankakee, in the county of Kankakee, State of Illinois, have invented a new and useful Dirigible Headlight; and we do hereby declare the following to be a full, clear, and exact description of the invention, such as will enable others skilled in the art to which it appertains to make and use the same.

The invention relates to dirigible headlight mechanisms for motor driven vehicles, and has for its object to provide a device of this character wherein the light will turn to the right or left, automatically, during the steering operation of the vehicle, thereby maintaining the light rays on the roadway ahead of the vehicle at all times.

A further object is to provide foot actuated lever means whereby the operator may tilt the lights during the steering operation, in a manner whereby the light rays may be projected onto the roadway at various distances from the forward end of the vehicle, which action will not only prevent blinding of operators of approaching vehicles, but will allow light to be projected at various points on the roadway.

A further object is to provide a dirigible headlight mechanism for automobiles comprising pivoted brackets movable in vertical longitudinal planes, which brackets are controlled by lever means in their tilting action, and are provided with vertically disposed rotatable lamp supporting shafts, which shafts are automatically controlled by a connection with the connecting rod, which links the steering knuckles together.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the forward portion of an automobile, showing the dirigible headlight mechanism applied thereto.

Figure 2 is a perspective view of the headlight mechanism, one of the light supporting brackets being eliminated for purposes of clearness.

Referring to the drawing, the numeral 1 designates a conventional form of automobile and 2 the forward axle thereof. Pivotally mounted in the bifurcations 3 of the ends of the axles are vertically disposed steering knuckles 4, on the spindles 5 of which wheels are adapted to be received. Extending rearwardly from the knuckles 4 are arms 6, which arms are connected together by a transversely disposed connecting rod 7, which may be controlled in the usual manner from the steering mechanism of the vehicle through a connecting rod 8. Rod 7 is moved transversely during the steering operation for turning the knuckles 4 and the wheels carried thereby.

Secured to the upper side of the side rails 9 of the vehicle frame are brackets 10, which brackets extend to the inner sides of the said rails 9, and are provided with bifurcations 11, in which is pivotally mounted at 12 vertically disposed brackets 13. The brackets 13 are tiltable in vertical longitudinal planes for allowing the rays of light to be projected on the ground ahead of the automobile at any particular distance desired for illuminating the road bed or lowering the light upon the approach of another vehicle. The tilting of the brackets is accomplished by the operator within the vehicle placing his foot on the foot lever 14 and depressing the same. The foot lever 14 is pivotally connected at 15 to an arm 16 of the rock shaft 17, therefore it will be seen that when the foot lever is depressed, the rock shaft 17 will be rocked and pulls imparted on the connecting rods 18 against the action of the coiled spring 19, through the medium of the arms 20, which are pivotally connected to the connecting rods 18. The forward ends of the connecting rods are pivotally connected at 21 to the downwardly extending arms 22 of the brackets 13 and consequently brackets 13 may be controlled in their pivotal movement from within the vehicle.

Brackets 13 above their pivotal points 12 are provided with recesses 23, into which the lower ends of the rotatable lamp supporting shafts 24 extend, which shafts are rotatably mounted in vertically disposed sleeves 25 of the brackets 13. Extending rearwardly from the lower ends of the shafts 24 are arms 26, which arms are linked together by the rod 27 in a manner whereby upon a longitudinal movement of the rod 27 the shafts 24 will be simultaneously rocked, thereby rocking the lamp supporting brackets 28 in which the lamps 29 are supported. Pivotally mounted at 30 on the rod 29 is a downwardly extending sleeve 31, and into which sleeve a vertically disposed shaft 32 extends and is slidably mounted. The lower end of the shaft 32 is pivoted at 33 to a forward extending arm 34 carried by the connecting rod 7; therefore it will be seen that upon a longitudinal movement of the connecting rod 7, the rod 27 will be simultaneously moved in the same direction, thereby causing the lamps 29 to be moved in the direction in which the vehicle is turning. During the turning operation it will be seen that the brackets 13 may be tilted on their pivotal points 12 by the operator placing his foot on the lever 14 and depressing the same.

From the above it will be seen that a dirigible headlight mechanism is provided, wherein the lamps will automatically turn in the direction the vehicle is turning, and that the operator may control the up and down movement of the lamp during the turning operation, thereby allowing complete control of the lights which is particularly advantageous for preventing blinding of operators of approaching vehicles and allowing illumination of the roadway immediately ahead of the vehicle.

The invention having been set forth what is claimed as new and useful is:—

A dirigible headlight mechanism for motor driven vehicles, said mechanism comprising brackets pivotally mounted intermediate their ends and movable in vertical longitudinal planes, light supporting brackets rotatably mounted on the first mentioned brackets above the pivotal points of the first mentioned brackets, link connections between the light supporting brackets, a steering mechanism, connections between the steering mechanism and the link connections whereby said link connections will be moved simultaneously with the steering mechanism, a transversely disposed rock shaft, a foot lever connected to said rock shaft, arms carried by the rock shaft adjacent its ends, downwardly extending arms carried by the first mentioned brackets below their pivotal points, links connecting the rock shaft arms and the downwardly extending arms and spring means for returning the pivoted brackets to normal position after a pivotal movement thereof.

In testimony whereof we have signed our names to this specification in the presence of two subscribing witnesses.

NIELS C. SORENSEN.
JOHN A. SPRINGET.

Witnesses:
FRED L. SCHNEIDER,
FRED. E. LEYNIS, Jr.